July 15, 1941.  C. A. NICKLE  2,249,488
TIMING DEVICE
Filed April 10, 1940
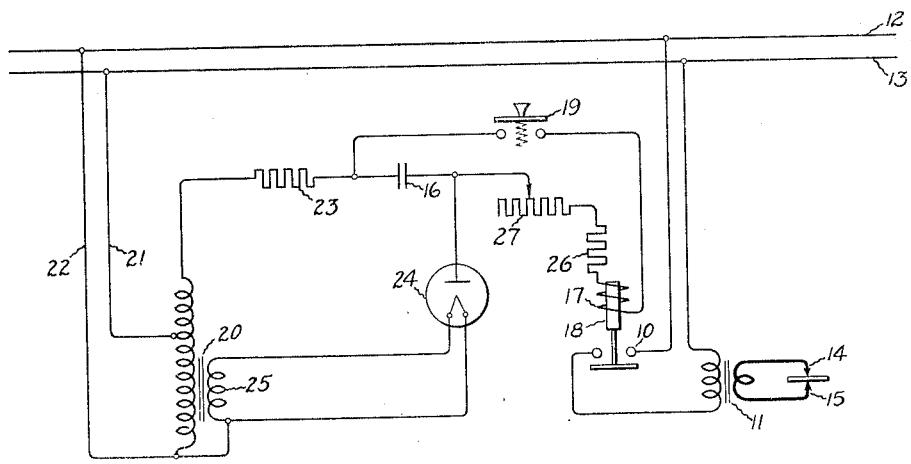
Inventor:
Clifford A. Nickle,
by Harry E. Dunlavy
His Attorney.

Patented July 15, 1941

2,249,488

UNITED STATES PATENT OFFICE 2,249,488

TIMING DEVICE

Clifford A. Nickle, Schenectady, N. Y., assignor to General Electric Company, a corporation of New York Application April 10, 1940, Serial No. 328,937

8 Claims. (Cl. 175—320)

My invention relates to timing devices and more particularly to electric timing devices.

An object of my invention is to provide an improved electric timing device which is simple in construction, reliable in operation, and which may be adapted to effect timing operations over a relatively large range.

I accomplish this and other objects by providing an electric timing device which includes a capacitor which is permanently connected to a source of charging current. In order to effect the timing operation of any suitable device the charged condenser is discharged through a magnetic coil which is adapted to effect operation of the device to be timed. The constants of the series circuit which includes the condenser and the coil may be suitably proportioned so that the circuit is critically damped and additional variable resistances may be inserted so as to vary the time of discharge of the condenser current in this series circuit.

My invention will be more fully set forth in the following description referring to the accompanying drawing, and the features of novelty which characterize my invention will be pointed out in the claims annexed to and forming a part of this specification.

In the drawing, the single figure is a wiring diagram of a timing device embodying my invention.

Referring to the drawing, I have illustrated my invention as applied to a timing device for causing a switch 10 to close and to remain closed for a predetermined time, at the end of which time the switch will drop out to its open position. Instead of a switch it is, of course, to be understood that my improved timing device may be applied to any suitable device which is to be actuated for a predetermined time. Furthermore, the switch 10 may be in circuit with any kind of an electrical device through which current is to flow for a predetermined time, and in the illustrated embodiment of my invention, switch 10 is in series with the primary winding of a welding transformer 11. The welding transformer is connected to any suitable source of power, such as the alternating current lines 12 and 13. The secondary of the transformer 11 is connected to the welding electrodes 14 and 15. Since the welding circuit illustrated is of the resistance type the electrodes 14 and 15 are connected to the parts of the work-piece which are to be joined together.

In order to effect closing of the switch 10 and to keep it closed for the time during which it is desired to effect the welding operation, I provide a timing circuit which includes a condenser 16, and a coil 17. The coil 17 may be the actuating coil of any suitable relay which has a core member 18 which is adapted to actuate the movable contact of the switch 10. The series circuit which includes this coil and the condenser is normally in an open circuit condition. However, when it is desired to institute the running of the predetermined time interval a switch of any suitable type, such as a push button switch 19 may be closed, thus completing this series circuit and allowing the condenser to discharge therethrough.

In order to charge the condenser 16 I provide a circuit which includes an auto transformer 20, which may be connected to any suitable source of power, such as a source of alternating current connected to the line 12, 13 through connections 21, 22. This transformer 20 is connected in series with the condenser 16 through a resistor 23 and a rectifier 24. The rectifier may be of any suitable type, such as a two element vacuum tube with its anode being connected to one side of the condenser, and its cathode to one side of the transformer 20. The opposite side of the condenser 16 is in turn connected through the resistor 23 to the other side of the transformer 20. I have also shown the cathode of the tube 24 connected to a separate coil 25 of the transformer 20. This connection merely provides a relatively small current for heating the cathode. It will be seen, therefore, that the charging circuit of the capacitor 16 is permanently connected thereto. This, however, will not appreciably affect the discharge circuit, when the switch 19 is closed, since the resistor 23 is made sufficiently large that the condenser charging current is less than the drop out value of the relay coil 17.

The operation of my improved electric timing device is as follows: When it is desired to close the switch 10 and start the welding current flowing, the operator closes the push button 19. This, it will be seen, completes the series circuit which includes the condenser 16 and the coil 17, thus allowing the charge which has previously been built up across the plates of the condenser to dissipate itself through this series circuit. Immediately upon closing of this series circuit, current will flow through the relay coil 17 which will cause the core member 18, normally biased to its open position, to rise to a second or closed position. In order to prevent the contacts from chattering the constants of the condenser-coil series circuit are so proportioned that this series circuit is critically damped. This condition may be obtained by suitably proportioning the constants of the condenser and the relay coil, or if it is more convenient, this condition may be obtained by adding a suitable resistor 26 to the series circuit, which resistance will be of just sufficient amount to obtain the critically damped condition. Furthermore, the constants of the circuit may be so proportioned that this critically damped circuit will allow the capacitor discharge to take place in any suitable time, such as one cycle. Then in order to provide a convenient arrangement for varying this time of discharge, a variable resistor 27 may be connected in the capacitor discharge circuit. By increasing the value of this resistance the time which it takes to discharge the condenser may be increased to a relatively high value, such as about 20 cycles.

I have illustrated my improved electrical timing device for application to a resistance welding machine where it is desirable to have the welding current flowing in the order of a few cycles time. However, it is, of course, to be understood that my electric timing device may be employed in other applications in which a predetermined time of either a lesser or a much greater amount may be desired than that used in the application of my timing device described above. The timing range may be varied by changing the value of the capacitor and the drop-out characteristic of the relay. Thus by changing the number of ampere-turns of coil 17 necessary to hold the switch 10 closed, the drop-out characteristic may be varied. This may be done in any suitable manner, such as by varying the magnetic reluctance of the magnetic circuit of the relay coil.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. A timing device including a member biased in one position, a coil for moving said member to a second position, a capacitor, a source of power, means for connecting said source to said capacitor for charging said capacitor, and means including a switch for connecting said coil in series with said capacitor so that said capacitor will discharge through said coil in order to move said member to said second position for instituting the running of a predetermined time, said member being held in said second position until the discharging current decreases to such a value that said member will move to said first position terminating the running of said predetermined time.

2. A timing device including a member biased in one position, a coil for moving said member to a second position, a capacitor, a source of power, means for connecting said source to said capacitor for charging said capacitor, means including a switch for connecting said coil in series with said capacitor so that said capacitor will discharge through said coil in order to hold said member in said second position for a predetermined time, and means for varying said predetermined time which is determined by the rate of discharge of said capacitor through said coil.

3. A timing device including a member biased in one position, a coil for moving said member to a second position, a capacitor, a source of power, means for connecting said source to said capacitor for charging said capacitor, means for connecting said coil to said capacitor so that said capacitor and coil series circuit when completed will be critically damped, and switch means for completing said series circuit so that said capacitor will discharge through said coil in order to hold said member in said second position for a predetermined time.

4. A timing device including a member biased in one position, a coil for moving said member to a second position, a work circuit switch so constructed and arranged as to be actuated upon movement of said member, a capacitor, a source of power, means for connecting said source to said capacitor for charging said capacitor, and means including a switch for connecting said coil in series with said capacitor so that said capacitor will discharge through said coil in order to hold said member in said second position and said work circuit switch actuated for a predetermined time.

5. A timing device including a member biased in one position, a coil for moving said member to a second position, a capacitor, a source of alternating current power, means including a rectifier and a resistor for connecting said source to said capacitor for charging said capacitor, and means including a switch for connecting said coil in series with said capacitor so that said capacitor will discharge through said coil in order to hold said member in said second position for a predetermined time.

6. A timing device including a member biased in one position, a coil for moving said member to a second position, a capacitor, a source of power, means for permanently connecting said source to said capacitor for charging said capacitor, and means including a switch for connecting said coil in series with said capacitor so that said capacitor will discharge through said coil in order to hold said member in said second position for a predetermined time.

7. A timing device including a member, means for biasing said member in one position, a coil for moving said member to a second position, a capacitor, a source of power, means including a resistor for permanently connecting said source to said capacitor for charging said capacitor, and means including a switch for connecting said coil in series with said capacitor so that said capacitor will discharge through said coil in order to hold said member in said second position for a predetermined time, said resistor being of such a value as to limit the capacitor charging current to a value less than that necessary to cause said coil to hold said member in said second position.

8. A timing device including a member movable from one position to a second position, a coil for moving said member to said second position, a work circuit switch so constructed and arranged as to be actuated upon movement of said member, a capacitor, a source of power, means for connecting said source to said capacitor for charging said capacitor, and means for connecting said coil in series with said capacitor so that said capacitor will discharge through said coil in order to hold said member in said second position and said work circuit switch actuated for a predetermined time.

CLIFFORD A. NICKLE.